United States Patent [19]
Matsuura et al.

[11] Patent Number: 5,108,201
[45] Date of Patent: Apr. 28, 1992

[54] POLYIMIDE OPTICAL WAVEGUIDE

[75] Inventors: Toru Matsuura, Kanagawa; Shiro Nishi, Tokyo; Shigekuni Sasaki, Saitama; Toshihiro Ichino, Kanagawa; Fumio Yamamoto, Ibaraki; Shinji Ando, Tokyo; Fusao Shimokawa, Saitama; Shinji Koike, Tokyo, all of Japan

[73] Assignee: Nippon Telegraph and Telephone Corporation, Tokyo, Japan

[21] Appl. No.: 692,249

[22] Filed: Apr. 26, 1991

[30] Foreign Application Priority Data

Apr. 27, 1990 [JP] Japan .................................. 2-110498
Apr. 27, 1990 [JP] Japan .................................. 2-110500
Jan. 11, 1991 [JP] Japan .................................. 3-12571
Jan. 11, 1991 [JP] Japan .................................. 3-12572

[51] Int. Cl.$^5$ ............................ G02B 1/04; G02B 6/16
[52] U.S. Cl. ................................... 385/143; 385/123; 385/129
[58] Field of Search ............... 350/96.23, 96.29, 96.30, 350/96.31, 96.33, 96.34, 96.12

[56] References Cited
U.S. PATENT DOCUMENTS 4,941,729 7/1990 Hardin et al. .................... 350/96.23
4,969,706 11/1990 Hardin et al. .................... 350/96.23
5,024,506 6/1991 Hardin et al. .................... 350/96.23

Primary Examiner—John D. Lee
Attorney, Agent, or Firm—Finnegan, Henderson, Farabow, Garrett & Dunner

[57] ABSTRACT

An optical waveguide which has properties including low optical losses, facile fabrication, controllable core-cladding refractive index ratio, and a high heat resistance is provided. The optical waveguide for light transmission therethrough has a core made of a polyimide obtained from at least one tetracarboxylic acid dianhydride and at least one diamine. The polyimide is (a) a polyimide homopolymer derived from a diamine represented by formula [I] as follows:

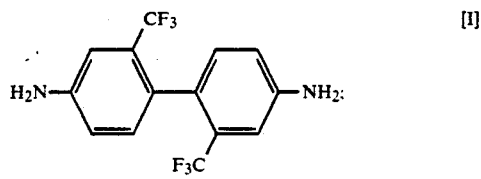

(b) a polyimide copolymer derived from at least one diamine including the diamine represented by the formula [I]; or (c) a mixture of the polyimide homopolymers.

4 Claims, 1 Drawing Sheet

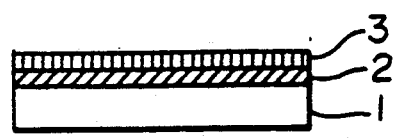
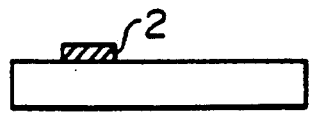
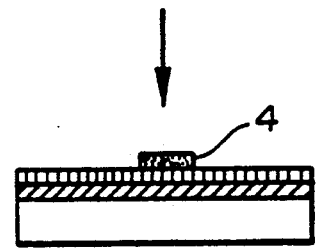
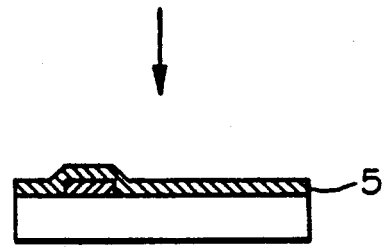
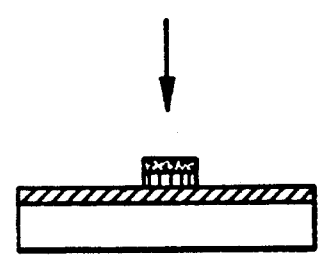
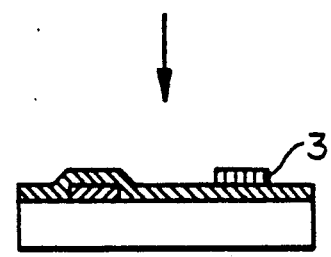
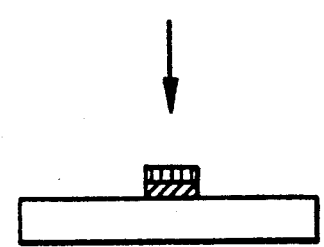
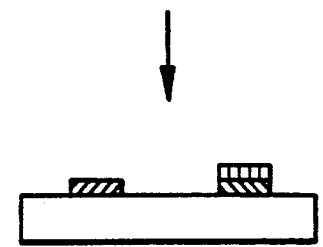
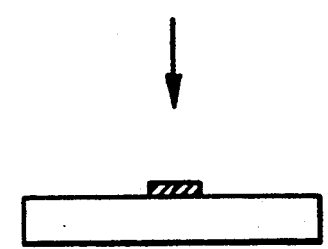
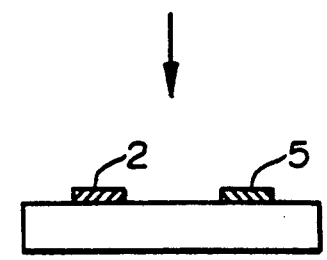
FIG.1  FIG.2  FIG.3  FIG.4

POLYIMIDE OPTICAL WAVEGUIDE

BACKGROUND OF THE INVENTION

1. Field of the invention

The present invention relates to optical waveguides, and more particularly, to plastic optical waveguides of which the refractive index can be freely controlled and which have improved resistance to heat.

2. Prior art

Together with the implementation of optical communication systems made possible through the development of low loss optical fiber, there has been an accompanying need for the development of various components employed in such optical communication systems. Particularly, there has been considerable demand for optical circuits and components therefor which support high throughput of communication signals, especially so for optical waveguides applicable to such systems.

In general, properties considered to be requisite for optical waveguides include: 1) low optical losses; 2) facile fabrication; 3) controllable core-cladding refractive index ratio; and 4) high heat resistance.

Efforts to develop optical waveguides with low optical losses have chiefly centered on implementations incorporating quartz glass. Due to the excellent permeability to light of quartz glass, it has been possible to achieve low optical losses of 0.1 dB/cm and less at a wavelength of 1.3 μm in optical waveguides fabricated therefrom. Manufacture of quartz glass optical waveguides, however, presents a number of problems including a lengthy manufacturing process in terms of time, the need for high temperatures during fabrication, and the problem of increased length which is necessary with quartz glass optical waveguides. In response to these problems, attempts have been made to produce optical waveguides using plastics such as polymethylmethacrylate (PMMA), which can be carried out at low temperatures. With conventional plastic optical waveguides, however, resistance to high temperatures is poor and optical loss in near infrared region is large.

Among the various organic polymers currently available, polyimide provides very good resistance to heat, for which reason these materials has been widely employed in fields of avionics, satellite technology and so on. In recent years particularly, it has been expected that polyimide materials would offer a variety of useful properties above and beyond resistance to heat, and come to be employed in an even wider range of applications. For example, it has been hoped that polyimides having a low coefficient of thermal expansion and low dielectric constant could be developed for use in circuit boards, LSI chips and the like as an interlayer dielectrics therefor. Polyimides having a low refractive index would be useful in optical communication applications, particularly so as cladding for optical waveguides. Additionally, there is a need for polyimides with a low water absorption.

Unfortunately, polyimides which adequately fulfill the above described needs have yet to be developed. It is believed that a polyimide of which the main chain is sufficiently rigid should provide a material having a suitably low coefficient of thermal expansion, and that monomers such as tetracarboxylic dianhydrides or diamines should have substituents which provide a suitably low dielectric constant and refractive index. For example, for epoxy resins, as reported in the Journal of *Polymer Science*, Part C, and in *Polymer Letters*, Vol. 24, No. 249 (1986), by using a polyfluorinated substituent for the curing agent, epoxy resins having a lowest dielectric constant. Further, as disclosed in Japanese Patent Application, First Publication No. Sho-61-44969, epoxy resins having a lowest refractive index using a polyfluorinated substituted base.

In consideration of the above discussion, it can be seen that shortcomings exist with conventional optical waveguides formed from quartz glass or plastic, and that these conventional optical waveguides do not adequately meet the previously described four properties considered essential for commercially produced optical waveguides, namely, low optical losses, facile fabrication, controllable core-cladding refractive index ratio and high heat resistance.

In addition, there have been no reports describing to control the refractive indices using not less than 2 kinds of polyimides having different fluorine contents one another.

In Japanese Patent Application, No. Hei-1-201170, the present inventors have disclosed that fluorinated polyimide prepared using 2,2'-bis-(trifluoromethyl)-4,4'-diaminobiphenyl have an extremely low dielectric constant and refractive index, and furthermore, have excellent transparency characteristics. Additionally, some of these highly transparent fluorinated polyimides can be dissolved in suitable solvents.

One possible application for which the disclosed fluorinated polyimides could be employed is the manufacture of optical waveguides. For the manufacture of optical waveguides, however, it is necessary to be able to freely control the core-cladding refractive index ratio, and when using the disclosed fluorinated polyimides, the refractive index can be coarsely varied over the range of from 1.49 to 1.71. Additionally, by virtue of having core and cladding layers with different refractive indices, a multilayer structure is necessary with such fluorinated polyimide optical waveguides. Because the disclosed highly transparent fluorinated polyimides are soluble in solvents of polyimide precursor, however, forming such a multilayer structure is difficult. As a result, optical waveguides formed from transparent polyimides which are soluble in organic solvents have not as yet been achieved.

SUMMARY OF THE INVENTION

It is an object of the present invention to provide optical waveguides having the properties of low optical losses; facile fabrication; controllable core-cladding refractive index ratio; and high heat resistance.

One aspect of the present invention concerns a waveguide for light transmission therethrough having a core, wherein the core is made of a polyimide obtained from at least one tetracarboxylic dianhydride and at least one diamine, the polyimide being selected from the group consisting of (a) a polyimide homopolymer derived from a diamine represented by formula [I] as follows:

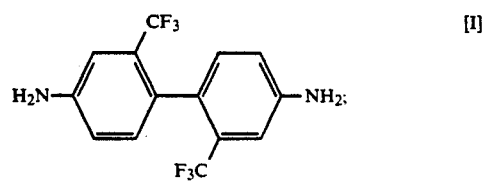

(b) a polyimide copolymer derived from at least one diamine including the diamine represented by the formula [I];

(c) a mixture of the polyimide homopolymers.

The second aspect of the present invention concerns a waveguide having a core for light transmission therethrough, wherein the core is made of a polyimide copolymer including at least two units represented by the formulae [II] and [III] as follows:

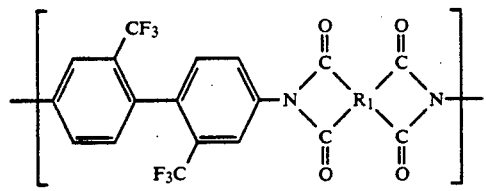
[II]

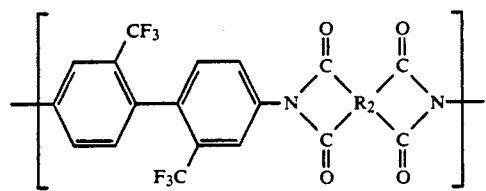
[III]

wherein each of $R_1$ and $R_2$ is a tetravalent organic group selected from the group consisting of

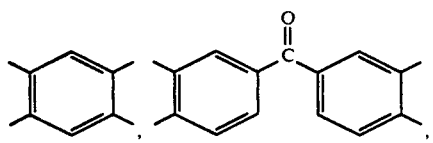

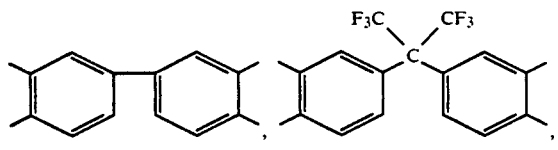

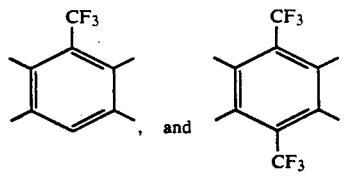
and with the proviso that $R_1$ and $R_2$ are different from each other.

The third aspect of the present invention concerns a method for making an optical waveguide for light transmission, the optical waveguide having a substrate and at least two stacked layers, first and second layers, formed to cover the substrate, the method comprising the steps of:

(a) preparing a substrate and at least two kinds of solutions, at least one of which being of a poly-(amic acid) which is a precursor of a polyimide, the polyimide being selected from the group consisting of (1) a polyimide homopolymer derived from a diamine represented by formula [I] as follows:

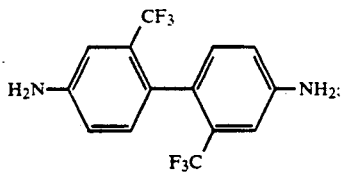
[I]

(2) a polyimide copolymer derived from at least one diamine including the diamine represented by the formula [I];

(3) a mixture of the polyimide homopolymers;

(b) forming a layer of a solution of said at least two kinds of solutions over the substrate;

(c) subjecting the layer of the solution to heat treatment at a maximum temperature of not less than 350° C. to solidify the layer of the solution to form a first layer;

(d) forming a layer of the other solution of said at least two kinds of solutions on the first layer, wherein the first layer is insoluble in the other solution;

(e) subjecting the layer of the other solution to heat treatment at a maximum temperature of not less than 350° C. to solidify the layer of the other solution to form a second layer.

The fourth aspect of the present invention concerns a method for making an optical waveguide having a substrate and transmission, the optical waveguide having a substrate and at least two stacked layers, first and second layers, formed to cover the substrate, the method comprising the steps of:

(a) preparing a substrate and at least two kinds of solutions, at least one of which being of a poly-(amic acid) which is a precursor of a polyimide copolymer including at least two units represented by formulae [II] and [III] as follows:

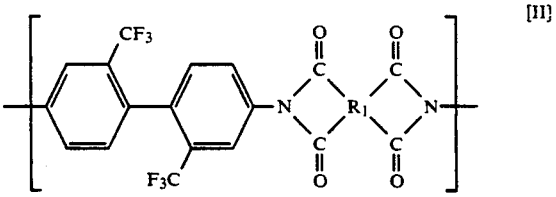
[II]

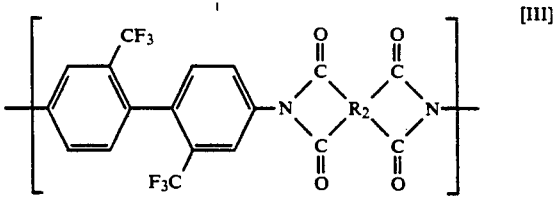
[III]

wherein each of $R_1$ and $R_2$ is a tetravalent organic group selected from the group consisting of

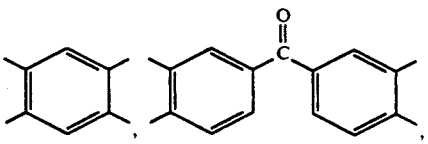

-continued

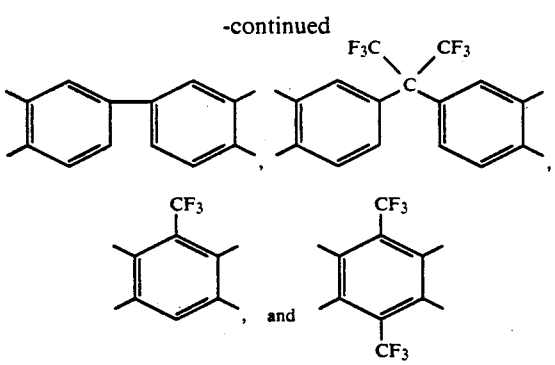

with the proviso that $R_1$ and $R_2$ are different from each other;

(b) forming a layer of a solution of said at least two kinds of solutions over the substrate;

(c) subjecting the layer of the solution to heat treatment at a maximum temperature of not less than 350° C. to solidify the layer of the solution to form a first layer;

(d) forming a layer of the other solution of said at least two kinds of solutions on the first layer, wherein the first layer is insoluble in the other solution;

(e) subjecting the layer of the other solution to heat treatment at a maximum temperature of not less than 350° C. to solidify the layer of the other solution to form a second layer.

The above objects, effects, features, and advantages of the present invention will become more apparent from the following description of preferred embodiments thereof.

BRIEF DESCRIPTION OF THE DRAWING

FIG. 1 is a sectional view showing a method for preparing a ridge-type optical waveguide;

FIG. 2 is a sectional view showing a method for preparing two kinds of ridge-type optical waveguides made of two kinds of polyimides formed on a substrate according to the present invention;

FIG. 3 is a sectional view of a ridge-type optical waveguide according to the present invention having a lower cladding layer made of a polyimide; and FIG. 4 is a sectional view of an embedded type optical waveguide.

DETAILED DESCRIPTION OF THE INVENTION

With the present invention, the optical waveguides thereof are characterized in that the polyimides used to form the core layer and/or the cladding layer are those polyimides having the highest heat resistance. These highly heat resistant polyimides can withstand temperatures of 300° C. and higher. Accordingly, they are adequately resistant to temperatures generated during soldering of adjacent or nearby electronic components. Moreover, there is the advantage that manufacture of long optical waveguides can be easily carried out by use of spin cast methods, thereby permitting manufacture of such optical waveguides at low cost. Because polyimide optical waveguides are generally manufactured at temperatures of 400° C. and less, rather than using quartz glass or silicon, prewired multi-use circuit boards made using such polyimides and the like.

In that conventionally available polyimides have a tendency to significantly absorb water, the refractive index of such compounds tends to vary widely during using them, and the optical losses thereof tend to be unacceptably high. With the object of providing a suitable material for the manufacture of optical waveguides, the present inventors have carried out various studies using synthetic technology and molecular engineering technology applicable to the development of fluorinated polyimides having refractive indices relatively high, and which when used as copolymers, make it possible to finely control the refractive indices of optical components made therefrom. As a result, using, for example, the diamine shown in formula I along with two different kinds of acid dianhydrides, fluorinated polyimide copolymers have been developed, the refractive indices of which are freely controllable, and which can be suitably employed for the manufacture of high quality optical waveguides.

Because some of the polyimides which are used to form essential components of the present invention are soluble in certain solvents, they can not be used in conventional methods for the formation of multilayer optical waveguides. In view of this fact, the present inventors have carried out extensive research concerning the effect of heat treatment at various temperatures on the solubility characteristics of polyimides. As a result, it has been found that upon heat treating suitable polyimides at a predetermined temperature and above, the solubility of the resulting material becomes negligible, thus permitting the fabrication of multilayer polyimide optical waveguides. In general, polyimides can be obtained by subjecting poly(amic acid)s which are precursors of the polyimides to heat-treatment up to approximately 300° C. to 350° C. Such the polyimides which are soluble in some solvents can be changed to be insoluble in the solvents by subjecting poly(amic acid)s to heat-treatment up to a maximum temperature of not less than 380° C. In the case where the temperature of heat-treatment is higher than desired, the obtained optical waveguide has high optical loss due to thermal decomposition of the polyimides. Therefore, it is desired that the heat-treatment is carried out at a maximum temperature of 380° C. in order to obtain an optical waveguide having a low optical loss.

Moreover, the present inventors have developed a manufacturing method for polyimide optical waveguides, wherein over a layer of organic solvent soluble polyimide, another layer is formed by applying a solution of a poly(amic acid) dissolved in an organic solvent in which the polyimide of the underlying layer is not soluble, thus further facilitating the manufacture of multilayer optical waveguides.

In the present invention, the employed polyimides include polyimide homopolymers derived from 2,2'-bis(trifluoromethyl)-4,4'-diaminobiphenyl, polyimide copolymers derived from at least one diamine including 2,2'-bis(trifluoromethyl)-4,4'-diaminobiphenyl, and a mixture of the polyimide homopolymers, as described above.

2,2'-bis(trifluoromethyl)-4,4'-diaminobiphenyl, which is a necessary component of the present invention, is prepared, for example, by the process disclosed in the Journal of Japanese Chemical Society, vol 3, 675–676 (1972).

A tetracarboxylic dianhydride used in the present invention includes pyromellitic dianhydride; 3,3',4,4'-benzophenonetetracarboxylic dianhydride; 3,3',4,4'-biphenyletetracarboxylic dianhydride; 2,2-bis(3,4-dicarboxyphenyl)hexafluoropropane dianhydride; trifluoromethylpyromellic dianhydride; 1,4-di(trifluoromethyl)pyromellic dianhydride; 1,4-di(pentafluoroethyl)pyromellic dianhydride; heptafluoropropylpyromellic dianhydride; or the like. Japanese Patent Application No. 63-165056 discloses a method for preparing a fluorine-containing anhydride of pyromellitic acid, which has a benzene ring having at least one fluoro-alkyl group, such as trifluoromethylpyromellic dianhydride; 1,4-di(trifluoromethyl)pyromellic dianhydride; 1,4-di(pentafluoroethyl)pyromellic dianhydride; heptafluoropropylpyromellic dianhydride; or the like. For example, a copolymer of poly(amic acid) is synthesized by reacting the diamine mentioned above with two kinds of tetracarboxylic dianhydrides. The tetracarboxylic dianhydrides used in the synthesis of the poly(amic acid)s may be replaced with the tetracarboxylic acids, the tetracarboxylic acid chlorides, or esters of the tetracarboxylic acids. Furthermore, a polyimide copolymer may be prepared by reacting the diamines with at least three kinds of tetracarboxylic anhydrides in order to control easily and precisely the refractive index of a waveguide.

The reaction mentioned above may be carried out in a polar organic solvent such as 1-methyl-2-pyrrolidinone, N,N-dimethylacetamide, N,N-dimethylformamide, or the like. In the present invention, a polyimide is derived from only one poly(amic acid) and a mixture of polyimides may be derived from a mixture of at least two poly(amic acid)s.

The polyimides used in the present invention include not only a polyimide homopolymer derived from 2,2'-bis(trifluoromethyl)-4,4'-diaminobiphenyl and a tetracarboxylic dianhidride but also a polyimide copolymer derived from 2,2'-bis(trifluoromethyl)-4,4'-diaminobiphenyl and a mixture including the polyimide homopolymers. In the polyimide copolymer and the mixture, the monomers (diamines or dianhidrides) listed below may be used with 2,2'-bis(trifluoromethyl)-4,4'-diaminobiphenyl and the tetracarboxylic dianhidride.

Such compatible diamines include m-phenylenediamine; 2,4-diaminotoluene; 2,4-diaminoxylene; 2,4-diamino durene; 4-(1H,1H,11H-eicosafluoroundecanoxy)-1,3-diaminobenzene; 4-(1H,1H-perfluoro-1-butanoxy)-1,3-diaminobenzene; 4-(1H,1H-perfluoro-1-heptanoxy)1,3-diaminobenzene; 4-(1H,1H-perfluoro-1-octanoxy)-1,3-diaminobenzene; 4-pentafluorophenoxy-1,3-diaminobenzene; 4-(2,3,5,6-tetrafluorophenoxy)-1,3-diaminobenzene; 4-(4-fluorophenoxy)-1,3-diaminobenzene; 4-(1H,1H,2H,2H-perfluoro-1-hexanoxy)-1,3-diaminobenzene; 4-(1H,1H,2H,2H-perfluoro-1-dodecanoxy)-1,3-diaminobenzene; p-phenylenediamine; 2,5-diaminotoluene; 2,3,5,6-tetramethyl-p-phenylenediamine; 2,5-diaminobenzotrifluoride; bis(trifluoromethyl)phenylenediamine; diaminotetra(trifluoromethyl)benzene; diamino(pentafluoroethyl)benzene; 2,5-diamino(perfluorohexyl)benzene; 2,5-diamino(perfluorobutyl)benzene; benzidine; 2'-dimethylbenzidine; 3,3'-dimethylbenzidine; 3,3'-dimethoxybenzidine; 2,2'-dimethoxybenzidine; 3,3',5,5'-tetramethylbenzidine; 3,3'-acetylbenzidine; 3,3'-bis(trifluoromethyl)-4,4'-diaminobiphenyl; octafluorobenzidine; 4,4'-diaminophenylether; 4,4'-diaminodiphenylmethane; 4,4'-diaminodiphenylsulfone; 2,2-bis(p-aminophenyl)propane; 3,3'-dimethyl-4,4'-diaminodiphenylether; 3,3'-dimethyl-4,4'-diaminodiphenylmethane; 1,2-bis(anilino)ethane; 2,2-bis(p-aminophenyl)hexafluoropropane; 1,3-bis(anilino)hexafluoropropane; 1,4-bis(anilino)octafluorobutane; 1,5-bis(anilino)decafluoropentane; 1,7-bis(anilino)tetradecafluoroheptane; 2,2'-bis(trifluoromethyl)-4,4'-diaminodiphenyl ether; 3,3'-bis(trifluoromethyl)-4,4'-diaminodiphenyl ether; 3,3',5,5'-tetrakis(trifluoromethyl)-4,4'-diamino diphenyl ether; 3,3'-bis(trifluoromethyl)-4.4'-diaminobenzophenone; 4,4''-diamino-p-terphenyl; 1,4-bis(p-aminophenyl)benzene; p-bis(4-amino-2-trifluoromethylphenoxy)benzene; bis(aminophenoxy)bis(trifluoromethyl)benzene; bis(aminophenoxy)tetrakis(trifluoromethyl)benzene; 4,4'''-diamino-p-quaterphenyl; 4,4'-bis(p-aminophenoxy)biphenyl; 2,2-bis{4-(p-aminophenoxy)phenyl}propane; 4,4'-bis(3-aminophenoxyphenyl)diphenylsulfone; 2,2-bis{4-(4-aminophenoxy)phenyl}hexafluoropropane; 2,2-bis{4-(3-aminophenoxy)phenyl}hexafluoropropane; 2,2-bis{4-(2-aminophenoxy)phenyl}hexafluoropropane; 2,2-bis{4-(4-aminophenoxy)-3,5-dimethylphenyl}hexafluoropropane; 2,2-bis{4-(4-aminophenoxy)-3,5-bis(trifluoromethyl)phenyl}hexafluoropropane; 4,4'-bis(4-amino-2-trifluoromethylphenoxy)biphenyl; 4,4'-bis(4-amino-3-trifluoromethylphenoxy)biphenyl; 4,4'-bis(4-amino-2-trifluoromethylphenoxy)diphenylsulfone; 4,4'-bis(3-amino-5-trifluoromethylphenoxy)diphenylsulfone; 2,2-bis{4-(4-amino-3-trifluoromethylphenoxy)phenyl}hexafluoropropane; bis{(trifluoromethyl)aminophenoxy)biphenyl; bis[({trifluoromethyl)aminophenoxy}phenyl]hexafluoropropane; diaminoanthraquinone; 1,5-diaminonaphthalene; 2,6-diaminonaphthalene; bis{2-[(aminophenoxy)phenyl]hexafluoroisopropyl}benzene; and the like.

Such the compatible dianhydrides include trifluoromethylpyromellitic dianhydride; di(trifluoromethyl)pyromellitic dianhydride; di(heptafluoropropyl)pyromellitic dianhydride; pentafluoroethylpyromellitic dianhydride; bis{3,5-di(trifluoromethyl)phenoxy}pyromellitic dianhydride; 2,3,3',4'-biphenyltetracarboxylic dianhydride; 3,3',4,4'-tetracarboxydiphenyl ether dianhydride; 2,3',3,4'-tetracarboxydiphenyl ether dianhydride; 3,3',4,4'-benzophenonetetracarboxylic dianhydride; 2,3,6,7-tetracarboxynaphthalene dianhydride; 1,4,5,7-tetracarboxynaphthalene dianhydride; 1,4,5,6-tetracarboxynaphthalene dianhydride; 3,3',4,4'-tetracarboxydiphenylmethane dianhydride; 3,3',4,4'-tetracarboxydiphenylsulfone dianhydride; 2,2-bis(3,4-dicarboxyphenyl)propane dianhydride; 2,2-bis(3,4-dicarboxyphenyl)hexafluoropropane dianhydride; 5,5'-bis(trifluoromethyl)-3,3',4,4'-tetracarboxydiphenyl ether dianhydride; 2,2',5,5'-tetrakis(trifluoromethyl)-3,3',4,4'-tetracarboxybiphenyl dianhydride; 5,5'-bis(trifluoromethyl)-3,3',4,4'-tetracarboxybiphenyl dianhydride; 5,5'-bis(trifluoromethyl)-3,3',4,4'-tetracarboxybenzophenone dianhydride; bis{(trifluoromethyl)dicarboxyphenoxy}benzene dianhydride; bis{(trifluoromethyl)dicarboxyphenoxy}(trifluoromethyl)benzene dianhydride; bis(dicarboxyphenoxy)(trifluoromethyl)benzene dianhydride; bis(dicarboxyphenoxy)bis(trifluoromethyl)benzene dianhydride; bis(dicarboxyphenoxy)tetrakis(trifluoromethyl)benzene dianhydride; 3,4,9,10-tetracarboxyperylene dianhydride; 2,2-bis{4-(3,4-dicarboxyphenoxy)phenyl}propane dianhydride; butanetetracarboxylic dianhydride; cyclopentanetetracarboxylic dianhydride; 2,2-bis{4-(3,4-dicarboxyphenoxy)phenyl}hexafluoropropane dianhydride; bis{(trifluoromethyl)dicarboxyphenoxy}biphenyl dianhydride; bis{(trifluoromethyl)dicarboxyphenoxy}bis(trifluoromethyl)biphenyl dianhydride; bis{(trifluoromethyl)dicarboxyphenoxy}diphenyl ether dianhydride; bis(dicarboxyphenoxy)bis(trifluoromethyl)biphenyl dianhydride; and the like. The dianhydrides listed above may be replaced with the tetracarboxylic acids, acid chlorides or esters of the tetracarboxylic acids, or the like.

With the manufacturing method for optical waveguides of the present invention, many of the well known different types of optical waveguides can be fabricated, including fiber type, parallel surface type, ridge type, lens type, and embedded type optical waveguides. By appropriately selecting the refractive index of the material used for the core and the material used for the cladding, the core cladding cladding refractive index ratio of these optical waveguides can be freely controlled so as to achieve wavelength dependent properties thereof which best suit the conditions and requirements under which they will be used.

With reference to FIG. 1, a manufacturing method for ridge type optical waveguides will be described. FIG. 1 illustrates one example of a manufacturing method for ridge type optical waveguides in accordance with the present invention, wherein a substrate 1, core layer 2, aluminum layer 3 and resist layer 4 can be seen. Over the substrate 1 which can be fabricated from silicon and the like, a layer of a poly(amic acid) which can be a precursor of a polyimide of the present invention is applied at a specified thickness. Upon heat curing, the previously applied poly(amic acid) is transformed into the above mentioned core layer 2. Next, the above mentioned aluminum layer 3 is formed over the core layer 2 using a vapor deposition method, after which resist is applied thereover. After the resist has been thus applied prebake, light exposure, development and afterbake steps are sequentially carried out, whereby a particular pattern can be imparted to the resist layer 4. The portions of aluminum layer 3 which are not protected by resist are then removed using a wet etching process, after which the portions of the polyimide core layer 2 which are not protected by aluminum layer 3 are then removed using a dry etching process. Finally, the remaining portions of aluminum layer 3 are removed using a wet etching process, whereupon the completed optical waveguide is obtained. The ridge type optical waveguide thus obtained therefore is made up of a lower cladding layer consisting of the above mentioned substrate 1 made of silicon or the like, a core layer derived from core layer 2 which is formed from one of the polyimides which characterize the present invention, and an overlying air layer which acts as an upper cladding layer.

FIG. 2 illustrates another example of a manufacturing method for ridge type optical waveguides in accordance with the present invention, wherein over an optical waveguide of the type prepared by the example shown in FIG. 1, a core layer 5 is formed which consists of a different polyimide of the present invention from that which forms the core layer 2.

FIG. 3 illustrates another example of a manufacturing method for ridge type optical waveguides in accordance with the present invention, wherein the polyimide layer having an index of refraction lower than the of the above described core layer 2 is first applied over substrate 1, after which steps identical to those of the example shown in FIG. 1 are carried out, starting with formation of the core layer 2 over the polyamide layer first applied over the substrate 1. In this way, a ridge type optical waveguide is fabricated having a lower cladding layer 6 consisting of the polyimide layer first applied over substrate 1, a core layer derived from the core layer 2, and an overlying air layer which acts as an upper cladding layer.

FIG. 4 illustrates yet another example of a manufacturing method for embedded type optical waveguides in accordance with the present invention, wherein starting with an optical waveguide of the type prepared by the example shown in FIG. 3, an upper cladding layer 7 is formed thereover which consists of a polyimide layer which has a lower index of refraction than that of the core layer 2.

In the following, the preferred embodiments of the present invention will be described in detail. Herein, examples of the fabrication of optical waveguides which incorporate one or more of the polyimides will be described. These examples should not be construed as limitations to the scope of the present invention, but rather, as illustrative examples so as to clearly describe the fabrication and constitution of the optical waveguides of the present invention in a concrete manner.

The decomposition temperature and refractive index are shown in Tables 1-1 and 1-2 for a number of polyimide homopolymers, polyimide copolymers, and mixtures of polyimide homopolymers used in the present invention. The listed values for decomposition temperature were obtained under a flowing nitrogen atmosphere with the temperature of the sample raising at a rate of 10° C./min., and represent the temperature resulting in a 10wt.% loss in the amount of polyimides studied under the above conditions. Refractive indices were measured using an abbe type refractometer at 20° C. at a wavelength of 589 nm.

Because these polyimide homopolymers, polyimide copolymers, and mixtures of the polyimide homopolymers had refractive indices ranging in fine gradations from 1.49 to 1.65, it was possible to freely control the core - cladding refractive indices of optical waveguides fabricated therefrom. The decomposition temperatures were very high, at a value of 500° C. or greater for every specimen, thus indicating that all of these polyimide compositions can withstand temperatures which develop during soldering of electrical components.

For fabricating multilayer devices using the polyimide homopolymers, polyimide copolymers, and mixtures of the polyimide homopolymers shown in Tables 1-1 and 1-2 which are soluble in certain organic solvents, when applying a polyimide layer over a previously prepared polyimide layer, it is necessary that a poly(amic acid) to be the second layer is applied dissolved in a solvent in which the first layer in not soluble. The solubility characteristics of the polyimides shown in Table 1-1 and the poly(amic acid)s were tested using a variety of organic solvents, the results of which are shown in Table 2. The results for the polyimide homopolymer 4 in Table 1-1 and its precursor (poly(amic acid)) were obtained as described below.

Multiple experimental specimens were prepared using 3 inch diameter silicon wafers having the surface layers of silicon oxide A 10wt % N,N'-dimethylacetamide (DMA) solution of the soluble poly(amic acid) which is a precursor of polyimide homopolymer 4 in Table 1-1 was applied by spin cast method over a surface of each silicon wafer, and subsequently heat-treated up to a maximum temperature of 350° C. so that a 10 μm thick layer of polyimide homopolymer 4 was formed to obtain the polyimide product. Then the samples of polyimide homopolymer 4 thus prepared and the samples of poly(amic acid) which is a precursor of the polyimide homopolymer 4 were tested in a variety of organic solvents at room temperature, whereby the solubility characteristics of each were assessed. As shown in Table 2, the poly(amic acid) dissolved in alcohol type solvents and in methylisobutyl ketone, whereas the corresponded polyimide homopolymer, which was a lower cladding part, did not.

Optical waveguides were prepared using the polyimide homopolymers, polyimide copolymers, and mixtures of the polyimide homopolymers shown in Tables 1-1 and 1-2. Optical losses in each were measured at wavelengths of 0.63 μm and 1.3 μm by means of the streak light scattering method and cutback method.

Examples

Example 1

A solution of a poly(amic acid), which is a precursor of polyimide homopolymer 1 in Table 1-1, in an amount of 10 % by weight in DMA, was cast on a silicon wafer 3 inches in diameter having an silicon oxide surface layer by a spin cast method and was subjected to heat-treatment up to a maximum temperature of 350° C. so that the heat-treated wafer had a 10 μm thick layer of polyimide homopolymer 1, thus obtaining a parallel-surface-type optical waveguide having a lower cladding layer of a silicon oxide layer, a core layer of polyimide homopolymer 1 in Table 1-1, and an upper cladding layer of an overlying air layer. In detail, heat treatment was carried out at 70° C. for 2 hours; at 160° C. for 1 hour; at 250° C. for 30 minutes, and at 350° C. for 1 hour. The result measurement of the photopropagation loss of the obtained waveguide using a streak light scattering method with light having a wavelength of 0.63 μm was 0.9 dB/cm.

Example 2

A parallel-surface-type optical waveguide having a lower cladding layer of a silicon oxide layer, a core layer of polyimide copolymer 11 in Table 1-1, and an upper cladding layer of an overlying air layer was obtained by repeating the same procedures as described in Example 1 except that a solution of a poly(amic acid), which is a precursor of polyimide copolymer 11 in Table 1-1, in an amount of 10% by weight in DMA was used instead of a solution of the poly(amic acid), which is the precursor of polyimide homopolymer 1 in Table 1-1, in an amount of 10% by weight in DMA. The result measurement of the photopropagation loss of the obtained optical waveguide using a streak light scattering method with light having a wavelength of 0.63 μm was 0.7 dB/cm.

Example 3

A parallel-surface-type optical waveguide having a lower cladding layer of a silicon oxide layer, a core layer of polyimide homopolymer 4 in Table 1-1, and an upper cladding layer of an overlying air layer was obtained by repeating the same procedures as described in Example 1 except that a solution of a poly(amic acid), which is a precursor of polyimide homopolymer 4 in Table 1-1, in an amount of 10% by weight in DMA was used instead of the solution of the poly(amic acid), which is the precursor of polyimide homopolymer 1 in Table 1-1, in an amount of 10% by weight in DMA. The result measurement of the photopropagation loss of the obtained optical waveguide measured by a streak light scattering method with light having a wavelength of 0.63 μm was 0.5 dB/cm.

Example 4

A solution of a poly(amic acid), which is a precursor of polyimide copolymer 16 in Table 1-1, in an amount of 10 % by weight in DMA was cast on a silicon wafer 3 inches in diameter having an silicon oxide surface layer by a spin cast method and was subjected to heat-treatment up to a maximum temperature of 350° C. (in detail, heat treatment was carried out at 70° C. for 2 hours; at 160° C. for 1 hour; at 250° C. for 30 minutes, and at 350° C. for 1 hour) so that the heat-treated wafer had a 30 μm thick layer of polyimide copolymer 16, thus forming a lower cladding layer. A solution of a poly(amic acid), which is a precursor of polyimide homopolymer 1 in Table 1-1, in an amount of 10% by weight in DMA was cast on the lower cladding layer by a spin cast method and the coated lower cladding layer was subjected to heat-treatment up to a maximum temperature of 350° C. (in detail, heat treatment was carried out at 70° C. for 2 hours; at 160° C. for 1 hour; at 250° C. for 30 minutes, and at 350° C. for 1 hour) so that the heat-treated lower cladding layer had a 10 μm thick layer of polyimide homopolymer 1, thus forming a core layer on the lower cladding layer. After an aluminum layer having a 0.3 μm thickness was formed on the core layer by means of electron-beam deposition, the core layer cast by the aluminum was subjected to resist processing. At first, a usual positive-type resist was formed on the processed layer of the wafer by a spin cast method and subsequently prebaked at approximately 95° C. The resist layer was then exposed to ultraviolet radiation through a mask for forming a pattern having a line width of 10 μm and a length of 60 mm by the use of an ultra-high pressure mercury vapor lamp, and subsequently developed with a developer for a positive-type resist. The developed layer was after-baked at 135° C. The aluminum parts which were not coated by the resist were subjected to wet etching. Subsequent to washing and drying the wafer, the polyimide of the wafer was subjected to reactive ion etching (RIE) processing. The aluminum layer formed on the polyimide layer was removed by the etching agent mentioned above, thus obtaining a ridge-type optical waveguide having a lower cladding layer of polyimide copolymer 16 in Table 1-1, a core layer of polyimide homopolymer 1 in Table 1-1, and an upper cladding of an overlying air layer. The result measurement of the photopropagation loss of the obtained optical waveguide using a cutback method with light having a wavelength of 1.3 μm was 0.3 dB/cm.

Example 5

A ridge-type waveguide having a lower cladding layer of polyimide homopolymer 4 in Table 1-1, a core layer of polyimide copolymer 7 in Table 1-1, and an upper cladding layer of an overlying air layer was obtained by repeating the same procedures as described in Example 4 except that a solution of a poly(amic acid), which is a precursor of polyimide homopolymer 4 in Table 1-1, in an amount of 10% by weight in DMA was used in the cladding layer instead of the solution of the poly(amic acid), which is the precursor of polyimide copolymer 16 in Table 1-1, in an amount of 10 % by weight in DMA; that a solution of a poly(amic acid), which is a precursor of polyimide copolymer 7 in Table 1-1, in an amount of 10% by weight in DMA was used in the core layer instead of the solution of the poly(amic acid), which is the precursor of polyimide homopolymer 1 in Table 1-1, in an amount of 10% by weight in DMA: and that the maximum temperature of heat-treatment to the poly(amic acid), being the precursor of polyimide homopolymer 4 in Table 1-1 to be the lower cladding layer was 380° C. instead of 350° C. In detail, the heat-treatment was carried out at 70° C. for 2 hours; at 160° C. for 1 hour; at 250° C. for 30 minutes, and at 380° C. for 1 hour. The result measurement of the photopropagation loss of the obtained optical waveguide using a cutback method with light having a wavelength of 1.3 μm was 0.3 dB/cm.

Example 6

A ridge-type waveguide having a lower cladding layer of polyimide homopolymer 4 in Table 1-1, a core layer of polyimide copolymer 7 in Table 1-1, and an upper cladding layer of an overlying air layer was obtained by repeating the same procedures as described in Example 5 except that a solution of a poly(amic acid), which is a precursor of polyimide copolymer 7 in Table 1-1, in an amount of 10% by weight in n-hexanol, was used in the core layer instead of the solution of the poly(amic acid), which is the precursor of polyimide copolymer 7 in Table 1-1, in an amount of 10% by weight in DMA; and that the maximum temperature of heat-treatment to the poly(amic acid), being the precursor of polyimide homopolymer 4 in Table 1-1 to be the lower cladding was 350° C. instead of 380° C. In detail, the heat-treatment was carried out at 70° C. for 2 hours; at 160° C. for 1 hour; at 250° C. for 30 minutes, and at 350° C. for 1 hour. The result measurement of the photopropagation loss of the obtained optical waveguide using a cutback method with light having a wavelength of 1.3 μm was 0.3 dB/cm.

Example 7

A ridge-type waveguide having a lower cladding layer of polyimide copolymer 10 in Table 1-1, a core layer of polyimide copolymer 11 in Table 1-1, and an upper cladding layer of an overlying air layer was obtained by repeating the same procedures as described in Example 5 except that a solution of a poly(amic acid), which is a precursor of polyimide copolymer 10 in Table 1-1, in an amount of 10% by weight in DMA, was used in the lower cladding layer instead of the solution of the poly(amic acid), which is the precursor of polyimide homopolymer 4 in Table 1-1, in an amount of 10% by weight in DMA; and that a solution of a poly(amic acid), which is a precursor of polyimide copolymer 11 in Table 1-1, in an amount of 10% by weight in DMA, was used in the core layer instead of the solution of the poly(amic acid), which is the precursor of polyimide copolymer 7 in Table 1-1, in an amount of 10% by weight in DMA. In this Example, the maximum temperature of heat-treatment to the poly(amic acid), being the precursor of polyimide copolymer 10 in Table 1-1 to be the lower cladding layer was 380° C. In detail, the heat-treatment was carried out at 70° C. for 2 hours; at 160° C. for 1 hour; at 250° C. for 30 minutes, and at 380° C. for 1 hour. The result measurement of the photopropagation loss of the obtained waveguide using a cutback method with light having a wavelength of 1.3 μm was 0.3 dB/cm.

Example 8

A ridge-type waveguide having a lower cladding layer of polyimide copolymer 10 in Table 1-1, a core layer of polyimide copolymer 11 in Table 1-1, and an upper cladding layer of an overlying air layer was obtained by repeating the same procedures as described in Example 7 except that a solution of a poly(amic acid), which is a precursor of polyimide copolymer 10 in Table 1-1, in an amount of 10% by weight in n-hexanol, was used in the lower cladding layer instead of the solution of the poly(amic acid), which is the precursor of polyimide copolymer 10 in Table 1-1, in an amount of 10% by weight in DMA; and that the maximum temperature of heat-treatment to the poly(amic acid), being the precursor of polyimide copolymer 10 in Table 1-1 to be the lower cladding was 350° C. instead of 380° C. In detail, the heat-treatment was carried out at 70° C. for 2 hours; at 160° C. for 1 hour; at 250° C. for 30 minutes, and at 350° C. for 1 hour. The result measurement of the photopropagation loss of the obtained optical waveguide using a cutback method with light having a wavelength of 1.3 μm was 0.3 dB/cm.

Example 9

A solution of a poly(amic acid), which is a precursor of polyimide copolymer 16 in Table 1-1, in an amount of 10 % by weight in DMA, was coated on the ridge-type waveguide obtained in Example 4 by a spin cast method and was subjected to heat-treatment up to a maximum temperature of 350° C. (in detail, the heat treatment was carried out at 70° C. for 2 hours; at 160° C. for 1 hour; at 250° C. for 30 minutes, and at 350° C. for 1 hour) so that the heat-treated waveguide had a 30 μm thick layer of polyimide copolymer 16, thus obtaining an embedded-type waveguide having a lower cladding layer of polyimide copolymer 16 in Table 1-1, a core layer of polyimide homopolymer 1 in Table 1-1, and an upper cladding layer of polyimide copolymer 16 in Table 1-1. Each layer of the obtained optical waveguide was composed of the polyimide according to the present invention. The result measurement of the photopropagation loss of the obtained optical waveguide using a cutback method with light having a wavelength of 1.3 μm was 0.1 dB/cm.

Example 10

A solution of a poly(amic acid), which is a precursor of polyimide homopolymer 4 in Table 1-1, in an amount of 10 % by weight in DMA, was cast on the ridge-type waveguide obtained in Example 5 by a spin cast method and was subjected to heat-treatment up to a maximum temperature of 380 ° C. (in detail, the heat treatment was carried out at 70° C. for 2 hours; at 160 ° C. for 1 hour; at 250 ° C. for 30 minutes, and at 380 ° C. for 1 hour) so that the heat-treated waveguide had a 30 μm thick layer of polyimide homopolymer 4, thus obtaining an embedded-type optical waveguide having a lower cladding layer of polyimide homopolymer 4 in Table 1-1, a core layer of polyimide copolymer 7 in Table 1-1, and an upper cladding layer of polyimide homopolymer 4 in Table 1-1. Each layer of the obtained waveguide was composed of the polyimide according to the present invention. The result measurement of the photopropagation loss of the obtained optical waveguide using a cutback method with light having a wavelength of 1.3 μm was 0.1 dB/cm.

Example 11

A solution of a poly(amic acid), which is a precursor of polyimide copolymer 10 in Table 1-1, in an amount of 10 % by weight in n-hexanol, was cast on the ridge-type waveguide obtained in Example 8 by a spin cast method and was subjected to heat-treatment up to a maximum temperature of 350 ° C. (in detail, the heat treatment was carried out at 70 ° C. for 2 hours; at 160 ° C. for 1 hour; at 250 ° C. for 30 minutes, and at 350 ° C. for 1 hour) so that the heat-treated waveguide had a 30 μm thick layer of polyimide copolymer 10, thus obtaining an embedded-type optical waveguide having a lower cladding layer of polyimide copolymer 10 in Table 1-1, a core layer of polyimide copolymer 11 in Table 1-1, and an upper cladding layer of polyimide copolymer 10 in Table 1-1. Each layer of the obtained optical waveguide was composed of the polyimide according to the present invention. The result measurement of the photopropagation loss of the obtained optical waveguide using a cutback method with light having a wavelength of 1.3 μm was 0.1 dB/cm.

Example 12

A solution of a poly(amic acid), which is a precursor of polyimide copolymer 11 in Table 1-1, in an amount of 10 % by weight in DMA, was cast on a silicon wafer 3 inches in diameter having an silicon oxide surface layer by a spin-coat method and was subjected to heat-treatment up to a maximum temperature of 380 ° C. (in detail, the heat treatment was carried out at 70 ° C. for 2 hours; at 160 ° C. for 1 hour; at 250 ° C. for 30 minutes, and at 380 ° C. for 1 hour) so that the heat-treated wafer had a 10 μm thick layer of polyimide copolymer 11, thus forming a core layer. After an aluminum layer having a 0.3 μm thickness was formed on the core layer by means of electron-beam deposition, the core layer coated by the aluminum was subjected to resist processing. At first, a usual positive-type resist was formed on the processed layer of the wafer by a spin-coat method and subsequently prebaked at approximately 95 ° C. The resist layer was then exposed to ultraviolet radiation through a mask for forming a pattern having a line width of 10 μm and a length of 60 mm by the use of an ultra-high pressure mercury vapor lamp, and subsequently developed with a developer for a positive-type resist. The developed layer was after-baked at 135° C. The aluminum parts which were not coated by the resist were subjected to wet etching. Subsequent to washing and drying the wafer, the polyimide (polyimide copolymer 11 in Table 1-1) of the wafer was subjected to RIE processing. The aluminum layer formed on the polyimide layer was removed by the etching agent mentioned above, thus obtaining a first ridge-type waveguide having a core layer of polyimide copolymer 11 in Table 1-1, and an upper cladding layer of an overlying air layer.

Next, a solution of a poly(amic acid), which is a precursor of polyimide homopolymer 4 in Table 1-1, in an amount of 10% by weight in DMA was cast on the first ridge-type optical waveguide obtained above by a spin cast method and was subjected to heat-treatment up to a maximum temperature of 380 ° C. (in detail, the heat treatment was carried out at 70 ° C. for 2 hours; at 160 ° C. for 1 hour; at 250 ° C. for 30 minutes, and at 380 ° C. for 1 hour) so that the heat-treated wafer had a 10 μm thick layer of polyimide copolymer 4, thus forming another core layer. A second ridge type optical waveguide was formed by repeating the same procedures as described in the method for preparing the first ridge-type optical waveguide mentioned above, thus obtaining two kinds of optical waveguides, having different refractive index each other, formed on the same substrate, wherein one optical waveguide had the core layer of polyimide 11 in Table 1- and the other optical waveguide had the core layer of polyimide homopolymer 4 in Table 1-1. The result measurements of the photopropagation loss of the obtained two kinds of optical waveguides, the first optical waveguide and the second optical waveguide, using a cutback method with light having a wavelength of 1.3 μm were 0.3 dB/cm and 0.3 dB/cm.

Example 13

A solution of a poly(amic acid), which is a precursor of polyimide copolymer 11 in Table 1-1, in an amount of 10 % by weight in DMA was cast on a silicon wafer 3 inches in diameter having an silicon oxide surface layer by a spin-cast method and the cast wafer was subjected to heat-treatment up to a maximum temperature of 350 ° C. (in detail, the heat treatment was carried out at 70 ° C. for 2 hours; at 160 ° C. for 1 hour; at 250 ° C. for 30 minutes, and at 350 ° C. for 1 hour) so that the heat-treated wafer had a 10 μm thick layer of polyimide copolymer 11, thus forming a core layer. After an aluminum layer having a 0.3 μm thickness was formed on the core layer by means of electron-beam deposition, the core layer cast by the aluminum was subjected to resist processing. At first, a usual positive-type resist was formed on the processed layer of the wafer by a spin cast method and subsequently prebaked at approximately 95° C. The resist layer was then exposed to ultraviolet radiation through a mask for forming a pattern having a line width of 10 μm and a length of 60 mm by the use of an extra-high pressure mercury vapor lamp, and subsequently developed with a developer for a positive-type resist. The developed layer was after-baked at 135° C. The aluminum parts which were not coated by the resist were subjected to a wet etching. Subsequent to washing and drying the wafer, the polyimide (polyimide copolymer 11 in Table 1-1) of the wafer was subjected to a RIE processing. The aluminum layer formed on the polyimide layer was removed by the etching agent mentioned above, thus obtaining a first ridge-type waveguide having a core layer of polyimide copolymer 11 in Table 1, and an upper cladding part of an overlying air layer.

Next, a solution of a poly(amic acid), which is a precursor of polyimide homopolymer 4 in Table 1-1, in an amount of 10% by weight in n-hexanol was cast on the first ridge-type optical waveguide obtained above by a spin cast method and was subjected to heat-treatment up to a maximum temperature of 350 ° C. (in detail, the heat treatment was carried out at 70 ° C. for 2 hours; at 160 ° C. for 1 hour; at 250 ° C. for 30 minutes, and at 350 ° C. for 1 hour) so that the heat-treated wafer had a 10 μm thick layer of polyimide homopolymer 4, thus forming another core layer. A second ridge type optical waveguide was formed by repeating the same procedures as described in the method for preparing the first ridge-type optical waveguide mentioned above, thus obtaining two kinds of optical waveguides, having different refractive index each other, formed on the same substrate, wherein one optical waveguide had the core layer of polyimide 11 in Table 1-1 and the other optical waveguide had the core layer of polyimide homopolymer 4 in Table 1-1. The result measurements of the photopropagation loss of the obtained two kinds of optical waveguides, the first optical waveguide and the second optical waveguide, using a cutback method with light having a wavelength of 1.3 μm were 0.3 dB/cm and 0.3 dB/cm.

Comparative Example

An attempt was made to prepare a ridge-type optical waveguide having a lower cladding layer of polyimide homopolymer 4 in Table 1-1, a core layer of polyimide copolymer 7 in Table 1-1, and an upper cladding layer of an overlying air layer obtained by repeating the same procedures as described in Example 5 except that the maximum temperature of heat-treatment to the poly-(amic acid), being the precursor of polyimide homopolymer 4 in Table 1-1 to be the lower cladding was 350° C. In detail, the heat-treatment was carried out at 70° C. for 2 hours; at 160° C. for 1 hour; at 250° C. for 30 minutes, and at 350° C. for 1 hour. However, such the optical waveguide was not obtained, because the lower cladding layer was dissolved when the solution of the poly(amic acid), which is the precursor of polyimide copolymer 7 in Table 1-1, in an amount of 10% by weight in DMA was coasted on the lower cladding layer which had heat-treated at the maximum temperature of 350° C.

TABLE 1-1

| Polyimide Homopolymer No. | Dianhidride [Dianhidride No.] | Diamine | Temperature of thermal decomposition (°C.) (10% reduced) | Refractive index |
|---|---|---|---|---|
| 1 | Pyromellitic Dianhydride [1] | 2,2'-bis(trifluoromethyl)-4,4'-diaminobiphenyl | 610 | 1.647 |
| 2 | 3,3',4,4'-Biphenyltetra carboxylic Dianhydride [2] | 2,2'-bis(trifluoromethyl)-4,4'-diaminobiphenyl | 602 | 1.663 |
| 3 | 3,3',4,4'-Benzophenone tetracarboxylic Dianhydride [3] | 2,2'-bis(trifluoromethyl)-4,4'-diaminobiphenyl | 585 | 1.672 |
| 4 | 2,2-Bis(3,4-dicarboxy phenyl)hexafluoropropane Dianhydride [4] | 2,2'-bis(trifluoromethyl)-4,4'-diaminobiphenyl | 569 | 1.551 |
| 5 | Trifluoromethyl pyromellitic Dianhydride [5] | 2,2'-bis(trifluoromethyl)-4,4'-diaminobiphenyl | 584 | 1.492 |
| 6 | 1,4-Di(trifluoromethyl) pyromellitic Dianhydride [6] | 2,2'-bis(trifluoromethyl)-4,4'-diaminobiphenyl | 496 | 1.503 |
| 7 | Dianhydride 1: 10 mol % Dianhydride 4: 90 mol % | 2,2'-bis(trifluoromethyl)-4,4'-diaminobiphenyl | 529 | 1.555 |
| 8 | Dianhydride 1: 20 mol % Dianhydride 4: 80 mol % | 2,2'-bis(trifluoromethyl)-4,4'-diaminobiphenyl | 542 | 1.560 |
| 9 | Dianhydride 1: 30 mol % Dianhydride 4: 70 mol % | 2,2'-bis(trifluoromethyl)-4,4'-diaminobiphenyl | 544 | 1.565 |
| 10 | Dianhydride 1: 40 mol % Dianhydride 4: 60 mol % | 2,2'-bis(trifluoromethyl)-4,4'-diaminobiphenyl | 545 | 1.570 |
| 11 | Dianhydride 1: 50 mol % Dianhydride 4: 50 mol % | 2,2'-bis(trifluoromethyl)-4,4'-diaminobiphenyl | 541 | 1.578 |
| 12 | Dianhydride 1: 60 mol % Dianhydride 4: 40 mol % | 2,2'-bis(trifluoromethyl)-4,4'-diaminobiphenyl | 551 | 1.583 |
| 13 | Dianhydride 1: 70 mol % Dianhydride 4: 30 mol % | 2,2'-bis(trifluoromethyl)-4,4'-diaminobiphenyl | 557 | 1.594 |
| 14 | Dianhydride 1: 80 mol % Dianhydride 4: 20 mol % | 2,2'-bis(trifluoromethyl)-4,4'-diaminobiphenyl | 557 | 1.605 |
| 15 | Dianhydride 1: 90 mol % Dianhydride 4: 10 mol % | 2,2'-bis(trifluoromethyl)-4,4'-diaminobiphenyl | 598 | 1.625 |
| 16 | Dianhydride 1: 99 mol % Dianhydride 4: 1 mol % | 2,2'-bis(trifluoromethyl)-4,4'-diaminobiphenyl | 609 | 1.644 |

TABLE 1-2

| Polyimide mixture No. | Polyimide homopolymer | Temperature of thermal decomposition (°C.) (10% reduced) | Refractive index |
|---|---|---|---|
| 17 | Polyimide homopolymer 1: 34 wt % Polyimide homopolymer 4: 66 wt % | 546 | 1.572 |
| 18 | Polyimide homopolymer 1: 50 wt % Polyimide homopolymer 4: 50 wt % | 561 | 1.585 |
| 19 | Polyimide homopolymer 1: 66 wt % Polyimide homopolymer 4: 34 wt % | 569 | 1.612 |
| 20 | Polyimide homopolymer 1: 75 wt % Polyimide homopolymer 4: 25 wt % | 588 | 1.621 |
| 21 | Polyimide homopolymer 1: 80 wt % Polyimide homopolymer 4: 20 wt % | 598 | 1.628 |

TABLE 2

| | Evaluation of Solubility | |
|---|---|---|
| Solvent | Soluble polyimide homopolymer 4 in Table 1-1 | Polyamic acid precursor of polyimide homopolymer 4 in Table 1-1 |
| Methanol | X[1] | O[2] |
| Ethanol | X | O |
| n-Butanol | X | O |
| n-Pentanol | X | O |
| n-Hexanol | X | O |
| n-Heptanol | X | O |
| n-Octanol | X | O |
| Diethylene glycol | O | O |

TABLE 2-continued

| | Evaluation of Solubility | |
|---|---|---|
| Solvent | Soluble polyimide homopolymer 4 in Table 1-1 | Polyamic acid precursor of polyimide homopolymer 4 in Table 1-1 |
| diethyl ether | | |
| Methyl isobutyl ketone | X | O |
| Diethylene glycol dimethyl ether | O | O |
| Bis(2-butoxyethyl) ether | X | X |
| Acetophenone | O | O |
| Isooctylacetate | X | X |
| 1,2-Diacetoxyethane | O | O |
| Cyclohexanol | X | X |
| Acetone | O | O |
| Tetrahydrofuran | O | O |
| Ethyl acetate | O | O |
| Benzene | X | X |
| Hexane | X | X |
| N,N-dimethyl acetamide | O | O |

[1] insoluble in the solvent
[2] soluble in the solvent

As described above, according to the present invention, an optical waveguide which has properties including low optical losses, facile fabrication, controllable core-cladding refractive index, and high heat resistance can be provided. The core-cladding refractive index ratio which has not been obtained in conventional quartz glass optical waveguides and plastic optical waveguides can be freely controlled according to the present invention.

The present invention has been described herein in terms of preferred embodiments thereof. Modifications to and variations on any of the embodiments can be made without departing from the essential spirit of this invention. Accordingly, it should be understood that the present invention includes all forms encompassed by the appended claims.

What is claimed is:

1. An optical waveguide for light transmission therethrough having a core, wherein the core is made of a polyimide obtained from at least one tetracarboxylic acid dianhydride and at least one diamine, the polyimide being selected from the group consisting of
   (a) a polyimide homopolymer derived from a diamine represented by formula [I] as follows:

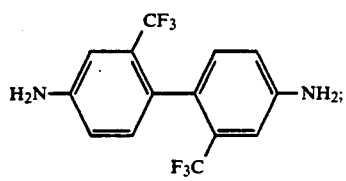

(b) a polyimide copolymer derived from at least one diamine including the diamine represented by the formula [I]; or
   (c) a mixture of the polyimide homopolymers.

2. An optical waveguide having a core for light transmission therethrough, wherein the core is made of a polyimide copolymer including at least two units represented by the formulae [II] and [III] as follows:

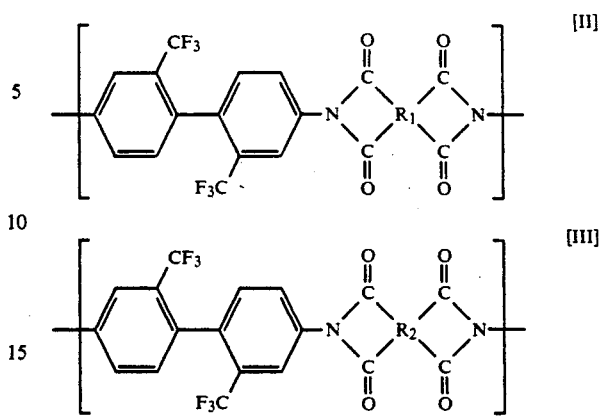

wherein each of $R_1$ and $R_2$ is a tetravalent organic group selected from the group consisting of

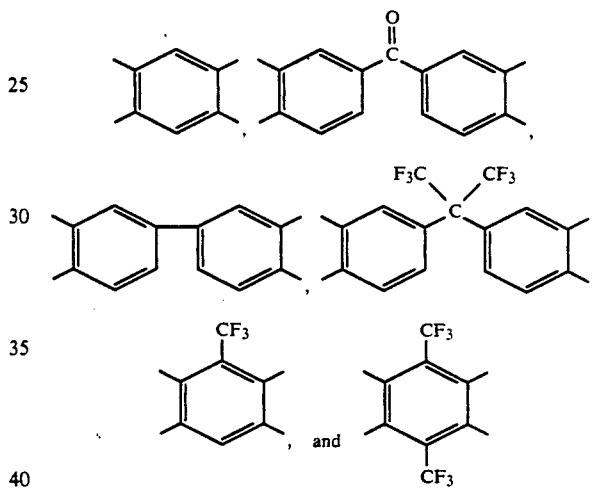

with the proviso that $R_1$ and $R_2$ are different from each other.

3. A method for making an optical waveguide for light transmission, the optical waveguide having a substrate and at least two stacked layers, first and second layers, formed to cover the substrate, the method comprising the steps of:
   (a) preparing a substrate and at least two kinds of solutions, at least one of which being of a poly(amic acid) which is a precursor of a polyimide, the polyimide being selected from the group consisting of
      (1) a polyimide homopolymer derived from a diamine represented by formula [I] as follows:

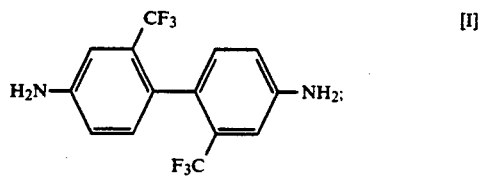

(2) a polyimide copolymer derived from at least one diamine including the diamine represented by the formula [I];
      (3) a mixture of the polyimide homopolymers;

(b) forming a layer of a solution of said at least two kinds of solutions over the substrate;

(c) subjecting the layer of the solution to heat treatment at a maximum temperature of not less than 350° C. to solidify the layer of the solution to form a first layer;

(d) forming a layer of the other solution of said at least two kinds of solutions on the first layer, wherein the first layer is insoluble in the other solution;

(e) subjecting the layer of the other solution to heat treatment at a maximum temperature of not less than 350° C. to solidify the layer of the other solution to form a second layer.

4. A method for making an optical waveguide for light transmission, the optical waveguide having a substrate and at least two stacked layers, first and second layers, formed to cover the substrate, the method comprising the steps of:

(a) preparing a substrate and at least two kinds of solutions, at least one of which being of a poly(amic acid) which is a precursor of a polyimide copolymer including at least two units represented by formulae [II] and [III] as follows:

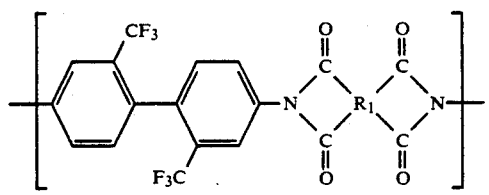
[II]

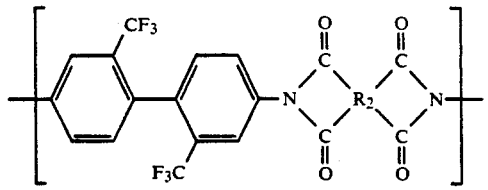
[III]

wherein each of $R_1$ and $R_2$ is a tetravalent organic group selected from the group consisting of

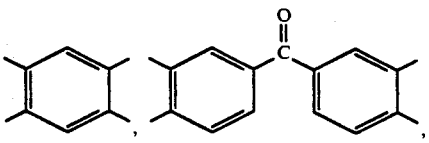

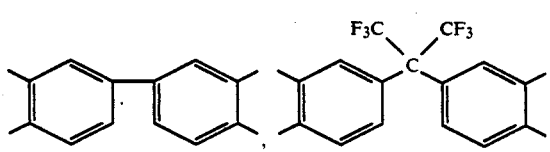

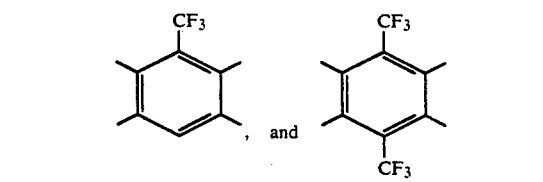, and 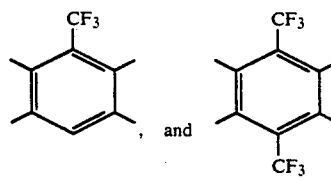

with the proviso that $R_1$ and $R_2$ are different from each other;

(b) forming a layer of a solution of said at least two kinds of solutions over the substrate;

(c) subjecting the layer of the solution to heat treatment at a maximum temperature of not less than 350° C. to solidify the layer of the solution to form a first layer;

(d) forming a layer of the other solution of said at least two kinds of solutions on the first layer, wherein the first layer is insoluble in the other solution;

(e) subjecting the layer of the other solution to heat treatment at a maximum temperature of not less than 350° C. to solidify the layer of the other solution to form a second layer.

* * * * *